US012748841B2

(12) United States Patent
Chritz et al.

(10) Patent No.: US 12,748,841 B2
(45) Date of Patent: Sep. 29, 2026

(54) METHODS TO IMPROVE SECURITY OF MULTI-TENANT MEMORY MODULES

(71) Applicant: Micron Technology, Inc., Boise, ID (US)

(72) Inventors: Jeremy Chritz, Seattle, WA (US); David Hulton, Seattle, WA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/989,583

(22) Filed: Dec. 20, 2024

(65) Prior Publication Data

US 2025/0225236 A1 Jul. 10, 2025

Related U.S. Application Data

(60) Provisional application No. 63/617,710, filed on Jan. 4, 2024.

(51) Int. Cl.
*G06F 21/55* (2013.01)
*G06F 12/14* (2006.01)

(52) U.S. Cl.
CPC ........ *G06F 21/554* (2013.01); *G06F 12/1408* (2013.01); *G06F 12/1441* (2013.01); *G06F 12/1458* (2013.01)

(58) Field of Classification Search
CPC .............................. G06F 21/554; G06F 21/55
See application file for complete search history.

(56) References Cited

U.S. PATENT DOCUMENTS 5,457,748 A 10/1995 Bergum et al.
7,814,316 B1 10/2010 Hughes et al.
8,674,823 B1 3/2014 Contario et al.
(Continued)

FOREIGN PATENT DOCUMENTS

CN 108710805 A 10/2018
CN 109255231 A 1/2019
(Continued)

OTHER PUBLICATIONS

U.S. Appl. No. 18/428,157 titled "Memory Systems and Devices Including Examples of Accessing Memory and Generating Access Codes Using an Authenticated Stream Cipher", filed Jan. 31, 2024; pp. all pages of application as filed.
(Continued)

*Primary Examiner* — Ponnoreay Pich
(74) *Attorney, Agent, or Firm* — Dorsey & Whitney LLP

(57) ABSTRACT

An example system includes a host computing device configured to host a first tenant and a second tenant, non-volatile memory configured to store data for the first tenant and data for the second tenant, and a memory controller including a cache of a volatile memory configured to store a first encrypted key associated with the first tenant used to access the data stored at the non-volatile memory and a second encrypted key associated with a second tenant used to access the data stored at the non-volatile memory. The memory controller further includes a processor having encryption logic configured to detect an attack on a portion of the cache storing the second encrypted key by the first tenant, and to erase the stored second encrypted key from the cache in response to detection of the attack.

22 Claims, 3 Drawing Sheets

(56) References Cited

U.S. PATENT DOCUMENTS

| | | | |
|---|---|---|---|
| 8,938,624 | B2 | 1/2015 | Obukhov et al. |
| 9,954,828 | B1 | 4/2018 | Chandrasekhar et al. |
| 10,175,118 | B1 | 1/2019 | Rezayee et al. |
| 10,733,291 | B1 | 8/2020 | Mcleod |
| 10,809,944 | B1 | 10/2020 | Ostrikov et al. |
| 10,929,572 | B2 | 2/2021 | Wu |
| 11,409,918 | B1 | 8/2022 | Sugavanam et al. |
| 11,537,298 | B2 | 12/2022 | Chritz et al. |
| 11,899,829 | B2 | 2/2024 | Chritz et al. |
| 11,899,942 | B2 | 2/2024 | Chritz et al. |
| 12,321,616 | B2 | 6/2025 | Chritz et al. |
| 12,619,791 | B2 | 5/2026 | Hulton et al. |
| 2009/0217058 | A1 | 8/2009 | Obereiner et al. |
| 2009/0300312 | A1* | 12/2009 | Handschuh ........... G06F 21/554 711/E12.001 |
| 2010/0005317 | A1 | 1/2010 | Pribadi et al. |
| 2011/0082979 | A1 | 4/2011 | Ramesh et al. |
| 2011/0154043 | A1 | 6/2011 | Lim et al. |
| 2011/0205016 | A1 | 8/2011 | Al-azen et al. |
| 2013/0239195 | A1* | 9/2013 | Turgeman ............. G06F 21/316 726/19 |
| 2014/0108794 | A1* | 4/2014 | Barton ................ H04L 63/0428 713/165 |
| 2014/0281587 | A1 | 9/2014 | Ignatchenko |
| 2015/0002900 | A1 | 1/2015 | Cochran et al. |
| 2015/0058637 | A1 | 2/2015 | Raskin et al. |
| 2016/0018996 | A1 | 1/2016 | Doumen |
| 2016/0078252 | A1 | 3/2016 | Chandra et al. |
| 2016/0098359 | A1 | 4/2016 | Adkins et al. |
| 2016/0204931 | A1 | 7/2016 | Kamath et al. |
| 2018/0095675 | A1 | 4/2018 | Kachare et al. |
| 2018/0181499 | A1 | 6/2018 | Branco et al. |
| 2018/0307848 | A1 | 10/2018 | Leiseboer et al. |
| 2018/0349293 | A1 | 12/2018 | Lin |
| 2018/0373598 | A1 | 12/2018 | Mondello et al. |
| 2019/0050347 | A1 | 2/2019 | Bolotov et al. |
| 2019/0056999 | A1 | 2/2019 | Foxworth et al. |
| 2019/0243714 | A1 | 8/2019 | Foxworth et al. |
| 2020/0167487 | A1 | 5/2020 | Kida et al. |
| 2020/0226270 | A1 | 7/2020 | Benedict |
| 2020/0364159 | A1 | 11/2020 | Lee et al. |
| 2021/0216629 | A1* | 7/2021 | Miller ..................... G06F 21/52 |
| 2021/0240862 | A1 | 8/2021 | Pelissier et al. |
| 2021/0328790 | A1 | 10/2021 | Eckel et al. |
| 2021/0377017 | A1 | 12/2021 | Benisty et al. |
| 2022/0050741 | A1 | 2/2022 | Lee |
| 2022/0171545 | A1 | 6/2022 | Chritz et al. |
| 2022/0171887 | A1 | 6/2022 | Chritz et al. |
| 2022/0222384 | A1 | 7/2022 | Hulton et al. |
| 2023/0126741 | A1 | 4/2023 | Chritz et al. |
| 2024/0176916 | A1 | 5/2024 | Chritz et al. |
| 2024/0201871 | A1 | 6/2024 | Chritz et al. |
| 2024/0291835 | A1* | 8/2024 | Sethi ................... H04L 63/1425 |
| 2024/0311496 | A1* | 9/2024 | Karr .................... G06F 11/1453 |
| 2025/0076228 | A1 | 3/2025 | Karoum et al. |
| 2025/0225236 | A1* | 7/2025 | Chritz ..................... G06F 21/79 |
| 2025/0335107 | A1 | 10/2025 | Chritz et al. |

FOREIGN PATENT DOCUMENTS

| | | | |
|---|---|---|---|
| CN | 110795776 | A | 2/2020 |
| CN | 111367834 | A | 7/2020 |
| CN | 111752743 | A | 10/2020 |
| EP | 3716071 | A1 | 9/2020 |
| JP | 2009245020 | A | 10/2009 |
| JP | 2011239123 | A | 11/2011 |
| JP | 2012168737 | A | 9/2012 |
| JP | 2020119298 | A | 8/2020 |
| WO | 2022119822 | A1 | 6/2022 |
| WO | WO2022/119819 | A1 | 6/2022 |

OTHER PUBLICATIONS

U.S. Appl. No. 19/205,070 titled “Memory Systems and Devices Including Examples of Accessing Memory and Generating Access Codes Using an Authenticated Stream Cipher”, filed May 12, 2025; pp. all pages of application as filed.

U.S. Appl. No. 17/146,274 titled “Encrypted Key Management” filed Jan. 11, 2021, pp. all pages of application as filed.

U.S. Appl. No. 18/146,120 titled, “Memory Systems and Devices Including Examples of Accessing Memory and Generating Access Codes Using an Authenticated Stream Cipher,”, filed on Dec. 23, 2022, pp. all pages of application as filed.

U.S. Appl. No. 17/108,904, titled “Memory Systems and Devices Including Examples of Accessing Memory and Generating Access Codes Using an Authenticated Stream Cipher”, filed Dec. 1, 2020, pp. all pages of application as filed.

U.S. Appl. No. 17/108,934, titled “ Memory Systems and Devices Including Examples of Generating Access Codes for Memory Regions Using Authentication Logic”, filed Dec. 1, 2020, pp. all pages of application as filed.

U.S. Appl. No. 19/535,273, titled “Encrypted Key Management”, filed Feb. 10, 2026; pp. all pages of application as filed.

* cited by examiner

METHODS TO IMPROVE SECURITY OF MULTI-TENANT MEMORY MODULES

CROSS-REFERENCE TO RELATED APPLICATIONS

This application claims the filing benefit of U.S. Provisional Application No. 63/617,710, filed Jan. 4, 2024. This application is incorporated by reference herein in its entirety and for all purposes.

BACKGROUND

Emerging memory architectures are designed to handle a range of memory access requests and may include memories with different characteristics. For example, memory may include dynamic random-access memory (DRAM) and phase-change memory (PCM)). Non-volatile memories may be highly non-uniform. For example, certain NAND flash memories (e.g., based on page type) may be faster to read or write than others, with latencies changing as they wear out, or with different levels of cell (e.g., multi-level-cells (MLC)), among different NAND flash memories. Emerging memory architectures may also utilize non-volatile dual in-line memory modules (NVDIMMs), such as NVDIMM-P or NVDIMM-F. NVDIMMs generally include both a non-volatile and a volatile memory device. In some applications, multiple tenants or users may be allocated memory on a particular NVDIMM to more efficiently use the memory, such as in a data center application. However, there may be scenarios where malicious tenants or users are able to attack portions of memory adjacent that are allocated to a different tenant.

DETAILED DESCRIPTION

Figure 1:
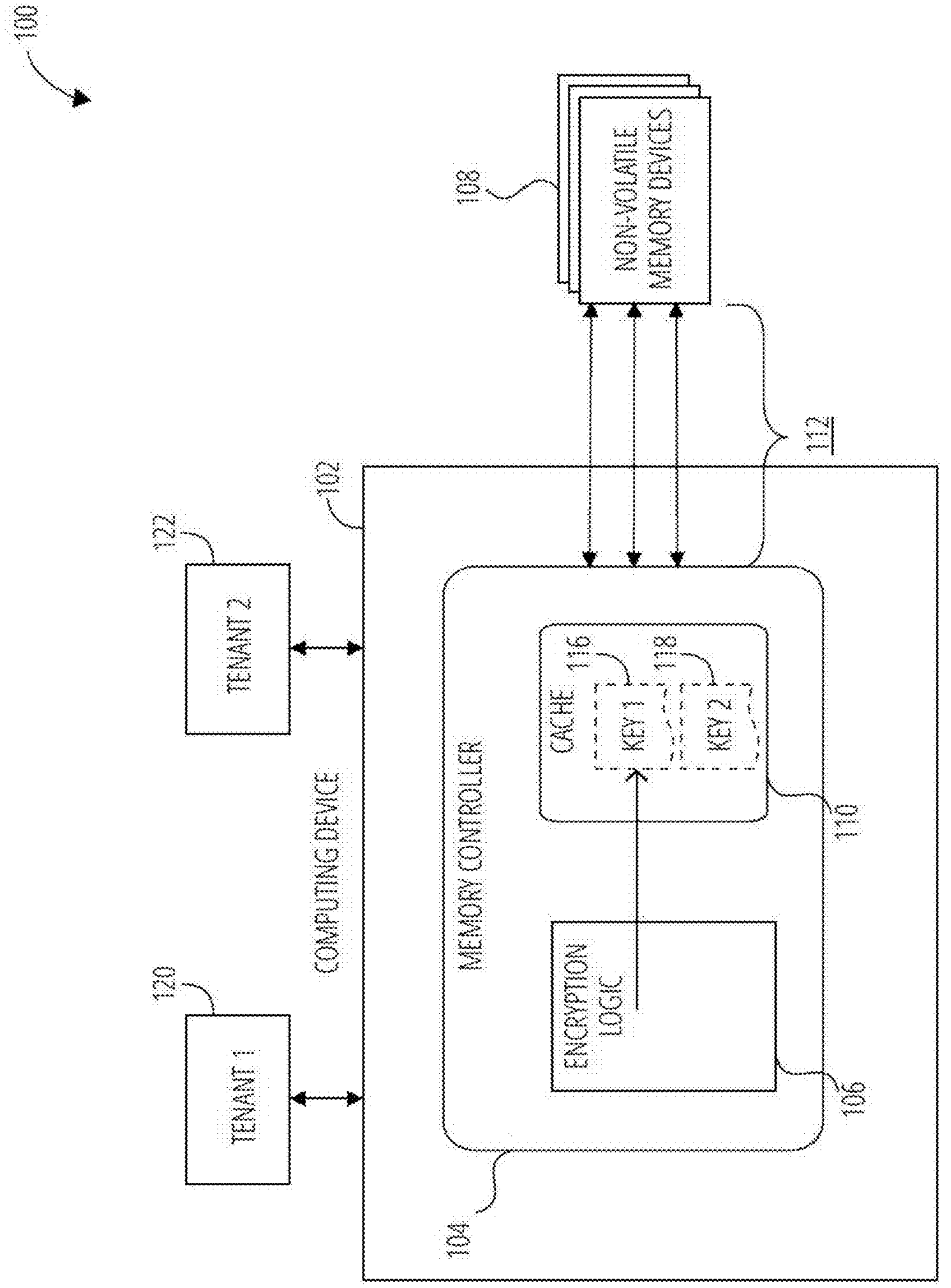
FIG. 1 is a schematic illustration of a memory system interacting in accordance with examples described herein.

Cryptographic methods may use block ciphers to provide security for data, e.g., to authenticate data using a cryptographic key. For example, a cryptographic key may transform data from plaintext to ciphertext when encrypting; and vice-versa when decrypting. A block cipher provides a block transformation of information bits to encrypt (or conversely, to decrypt) data. For example, the Advanced Encryption Standard (AES) or a quantum cipher are types of block ciphers. Additionally, a block cipher may operate in different modes within a cryptographic device/method, e.g., as a "stream cipher" in which a counter is used. For example, the counter may be used as a basis to alter the underlying cryptographic key used by the block cipher, such that the cryptographic key changes over time; to, in turn, alter data in an encrypted stream of data. For example, Galois/Counter Mode (GCM) is a type of stream cipher.

It may be complex and cumbersome to secure NVDIMM devices. This task may become even more difficult in multi-tenant user cases. For example, in some data centers, multiple users (or tenants) may access a single computing device to store data on non-volatile memory devices. To prevent inadvertent or unauthorized access to particular regions of memory in the non-volatile memory devices, a key may be generated for particular memory access requests of certain users to access data on the non-volatile memory devices, or, at least a particular region of memory of the non-volatile memory devices. Accordingly, the key of a particular user may be used only by that user (e.g., tenant) to access data stored on the non-volatile memory devices.

In some examples, the key may be stored in the volatile memory (e.g., cache) during operation. Volatile memory can be susceptible to certain kinds of attacks from malicious actors, including row hammer attacks. For example, in a multi-tenant application, two tenants may be allocated physically adjacent portions of a memory. In this example, a malicious tenant may be capable of attacking volatile memory of an adjacent tenant.

Examples of systems and methods described herein provide for erasing an encrypted key used for data access to a non-volatile memory device in a multi-tenant application when an attack by a malicious actor is detected. Computing devices that regularly access memory devices may do so through a memory controller. For example, a host computing device may generate memory access requests which are routed through a memory controller that controls access to various coupled memory devices, which may be non-volatile memory devices. Generally, a memory access request can be or include a command and an address, for example, a memory command and a memory address. In various implementations, the memory access request may be or include a command and an address for a read operation, a write operation, an activate operation, or a refresh operation at coupled non-volatile memory devices. Generally, a received command and address may facilitate the performance of memory access operations at coupled memory devices, such as read operations, write operations, activate operations, and/or refresh operations for the coupled memory devices.

Using the systems and methods described herein, a memory controller may generate a respective encrypted key for each tenant that may be used to access data stored in one or more non-volatile memory devices. For example, the encrypted keys may be written to a shared cache coupled to a volatile memory device or a shared cache that is a volatile memory device. To provide security of data stored on the non-volatile memory devices, the memory controller may store the encrypted keys for each tenant in a local cache of the memory controller. For example, the local cache at the memory controller may be a volatile memory device. In the example, because the keys are stored in a shared cache, a malicious actor may attack a portion of the shared cache of an adjacent tenant in an effort to steal the key. Thus, to mitigate against these types of attacks, the encryption logic may include circuitry to detect malicious attacks, and to circumvent the attacks, such as by blocking memory accesses by the malicious tenant, refreshing victim rows, and/or erasing the encryption key from volatile memory/shared cache.

Accordingly, without the encrypted key, the data stored on the non-volatile memory devices for the attacked tenant could not be accessed. Therefore, advantageously, example systems and methods described herein provide security for data stored on non-volatile memory devices accessed by a memory controller. In some examples, the non-volatile memory devices may be NAND memories implemented as NVDIMMs, interacting with the memory controller in accordance with an NVDIMM protocol, such as NVDIMM-P or NVDIMM-F.

Generally, a memory controller provides access to data stored on non-volatile memory devices. In examples described herein, the memory controller may use a respective encrypted key for each tenant to provide authenticated access to data stored on non-volatile memory devices. In some implementations, the encrypted keys may be specifically generated for data that is to be accessed stored on non-volatile memory devices. For example, the memory controller may generate an encrypted key for data associated with a received memory access request. Based on that memory access request, data read or written by a host computing device to various non-volatile memory devices may be accessed in an authenticated manner, e.g., using the generated encrypted key. For example, a provisioned key may be encrypted according to an AES cipher or a quantum cypher, e.g., encrypted as a cryptographic key. The authentication logic of a memory controller may utilize a pseudorandom value from a pseudorandom value generator and a provisioned key (e.g., a Disk Encryption Key (DEK)) to generate the encrypted key, e.g., a cryptographic key. In an example implementation of an AES cipher, the pseudorandom value may be used as an initialization vector (IV) for the AES cipher. Quantum cyphers may be used in alternative embodiments. As described herein, the generated encrypted key may be referred to, for simplicity, as the key for the non-volatile memory device(s). Advantageously, the key may provide security for the specific data accessed by the memory controller to that non-volatile memory device. For example, the data accessed (e.g., read or written) may be encrypted or decrypted (e.g., as plaintext or ciphertext) using the key.

FIG. 1 is a schematic illustration of a system 100 arranged in accordance with examples described herein. System 100 includes a computing device 102 including a memory controller 104, which may control one or more non-volatile memory devices 108. Memory controller 104 includes encryption logic 106, which may be implemented using a processor (e.g., examples of which are described with reference to FIG. 2), and a cache 110. The computing device 102 may be configured to service data access requests from two tenants 120 and 122 to store respective data. It is appreciated that inclusion of two tenants is exemplary, and additional tenants may be included without departing from the scope of the disclosure. The cache 110 may be implemented using a volatile memory device. The memory controller 104 is coupled to non-volatile memory devices 108 via respective memory buses 112. In operation, the encryption logic 106 may generate a key 116 for the tenant 120 and a key 118 for the tenant 122 that may each be encrypted and may be used to access data on the non-volatile memory devices 108. For example, the key 116 may be used by the memory controller 104 to authenticate access to the non-volatile memory devices 108 by the tenant 120 and the key 118 may be used by the memory controller 104 to authenticate access to the non-volatile memory devices 108 by the tenant 122. The encryption logic 106 may store the key 116 and the key 118 in the cache 110.

Because the encryption keys 116 and 118 are stored in the shared cache 110, there may instances where a malicious tenant 120 or 122 could try to attack the volatile nature of the cache 110 to retrieve the key 116 or 118 of the other tenant 120 or 122, such as via a row hammer type of attack. Thus, the encryption logic 106 may include circuitry to detect these malicious attacks, and to circumvent the attacks, such as by blocking memory accesses by the malicious tenant 120 or 122, refresh victim rows, and/or erase the target key 116 or 118 from the cache 110. Erasing the target key 116 or 118 may prevent it from falling into the wrong hands, and therefore prevent unauthorized access to encrypted data stored at the non-volatile memory devices 108.

The non-volatile memory devices 108 may store data retrieved by and/or for access by the computing device 102 on behalf of the tenants 120 and 122. As some examples, the computing device 102 may be a server at a data center or a laptop at a data center, and the computing device 102 may process datasets (e.g., image or content datasets) for use by one or more neural networks hosted on computing device 102. A dataset for each tenant 120 and 122 may be stored in one or more of the non-volatile memory devices 108 (e.g., one or both of the datasets may be distributed among the non-volatile memory devices 108). In some implementations, one or both of the datasets may include personally identifiable information (PII) such that an operator of the server may desire security for the data stored on the non-volatile memory devices 108. For example, if a malicious tenant 120 or 122 were to try to access the key 116 or 118 in an effort to acquire the PII data stored on the non-volatile memory devices 108 for the other tenant 120 or 122, the key 116 or 118 to access the target data stored on the non-volatile memory devices 108 would be erased from the cache 110 of the memory controller 104 when the memory controller 104 detects the attack on the cache 110; thereby making it difficult for the malicious tenant 120 or 122 to access the data stored on the non-volatile memory devices 108. While PII has been provided as an example of data for which security may be desired, any data may be protected in accordance with examples described herein including proprietary data, sensitive data, or confidential data.

The memory controller 104 may be an NVDIMM memory controller implemented in the computing device 102. For example, the computing device 102 may be a host computing device that is coupled to the memory controller 104 via a host bus (not depicted). In the example of an NVDIMM memory controller, the host bus may operate in accordance with an NVDIMM protocol, such as NVDIMM-F, NVDIMM-N, NVDIMM-P, or NVDIMM-X. In such implementations, the non-volatile memory devices 108 may be NAND memory devices or 3D XPoint memory devices. Accordingly, the non-volatile memory devices 108 may also operate as persistent storage for the cache 110, which may be a volatile memory device and/or operate as persistent storage for any volatile memory on the memory controller 104 or the computing device 102. Generally, volatile memory may have some improved characteristics over non-volatile memory (e.g., volatile memory may be faster). The non-volatile memory devices 108 may also include one or more types of memory, including but not limited to: DRAM, SRAM, triple-level cell (TLC) NAND, single-level cell (SLC) NAND, SSD, or 3D XPoint memory devices. Data stored in or data to be accessed from the non-volatile memory devices 108 may be communicated via the memory buses 112 from the memory controller 104. For example, the memory buses 112 may be PCIe buses.

Computing devices described herein, such as computing device 102 shown in FIG. 1, may be implemented using generally any computing device 102 device for which a computing capability using non-volatile memory devices is desired. For example, computing device 102 may be implemented using a smartphone, smartwatch, computer (e.g., a server, laptop, tablet, desktop), a wearable computing device, a vehicle, an appliance, or an Internet-of-Things (IoT) computing device. While not explicitly shown in FIG. 1, computing device 102 may include any of a variety of components in some examples, including, but not limited to, memory, input/output devices, circuitry, processing units (e.g. processing elements and/or processors), or combinations thereof.

Figure 2:
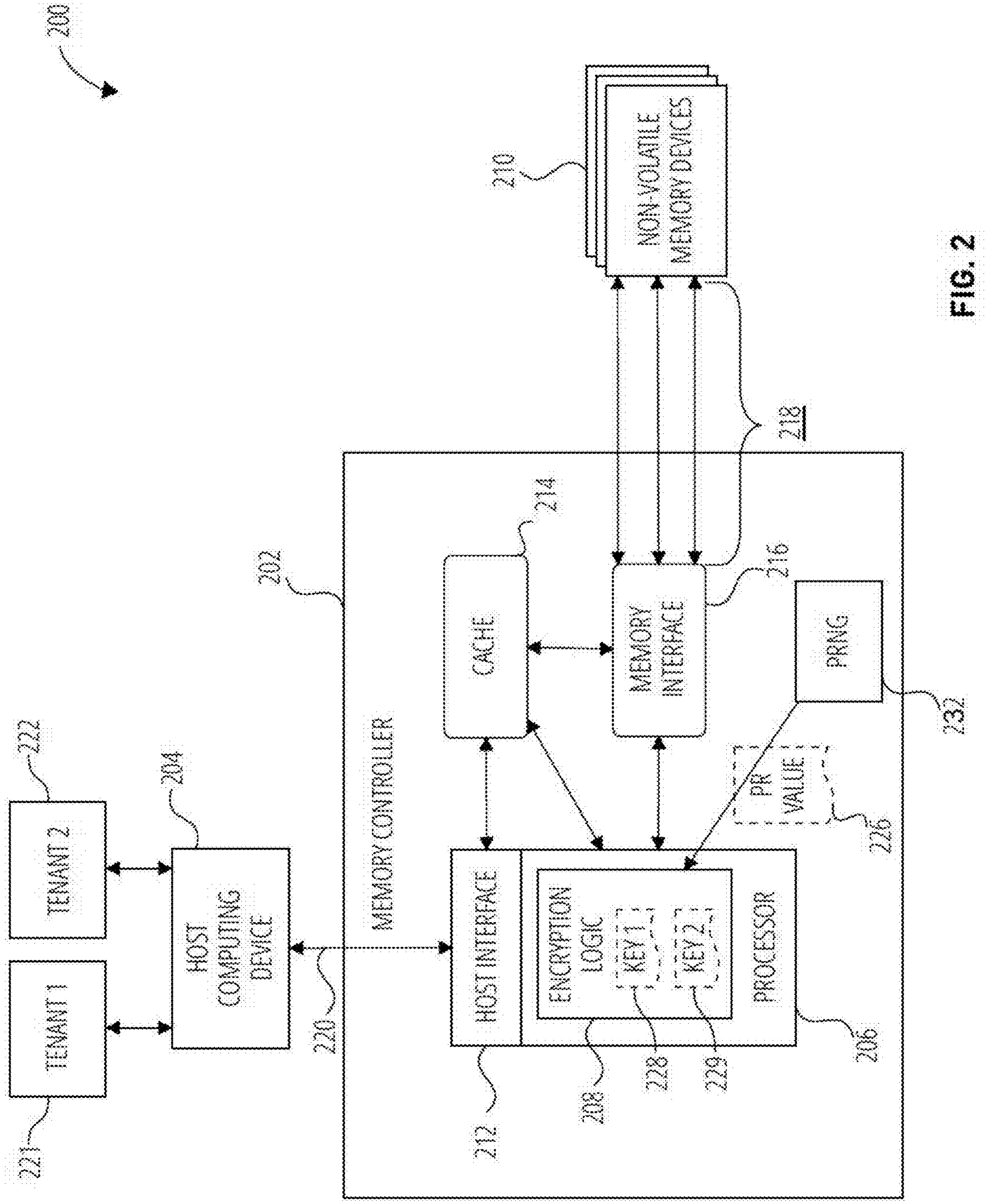
FIG. 2 is a schematic illustration of a memory system interacting in accordance with examples described herein.

FIG. 2 is a schematic illustration of a memory system 200 arranged in accordance with examples described herein. The host computing device 204 may be configured to service data access requests from two tenants 220 and 222 to store respective data. It is appreciated that inclusion of two tenants is exemplary, and additional tenants may be included without departing from the scope of the disclosure. In FIG. 2, similarly-named elements may have analogous operation or function as described with respect to FIG. 1. For example, encryption logic 208 may operate as described with respect to encryption logic 106 of FIG. 1. In some examples, non-volatile memory devices 210 may operate as described with respect to non-volatile memory devices 108 of FIG. 1. Memory system 200 includes a host computing device 204 coupled to memory controller 202, which may control one or more non-volatile memory devices 210. In some examples, the memory controller 202 is embodied in or is an element of the host computing device 204. In such cases, the host computing device 204 may be an SOC, CPU, GPU, FPGA, or the like, and the memory controller 202 may be logic, circuitry, or a component of such SOC, CPU, GPU, or FPGA. In some examples, the host computing device 204 is one physical device and the memory controller 202 is a separate physical device (e.g., each may be chiplets in a system of chiplets). In some cases, memory controller 202 and non-volatile memory devices 210 are elements of a module (e.g., a DIMM, card, or drive) and the host computing device 204 is a separate processor.

Memory controller 202 may include a host interface 212 which may couple to a host bus 220 for connection to the host computing device 204. The host interface 212 is coupled to processor 206 or processing resource, which may be an SOC, ASIC, FPGA, or the like, and may be separate from or an element of host computing device 204 (as described above). The processor 206 may include encryption logic 208. The host interface 212 and the processor 206 may also be coupled to the cache 214 via internal memory controller buses, for example. The processor 206 is coupled to non-volatile memory devices 210 via memory interface 216 and respective memory buses 218. The memory interface 216 is also coupled to the cache 214, e.g., also via an internal memory controller bus. Memory controller 202 also includes a pseudorandom number generator (PRNG) 232 that generates pseudorandom value 226 and provides pseudorandom value 226 to the encryption logic 208.

In example implementations, the processor 206 may include any type of microprocessor, central processing unit (CPU), ASIC, digital signal processor (DSP) implemented as part of a field-programmable gate array (FPGA), a system-on-chip (SoC), or other hardware. For example, the processor 206 may be implemented using discrete components such as an application specific integrated circuit (ASIC) or other circuitry, or the components may reflect functionality provided by circuitry within the memory controller 202 that does not necessarily have a discrete physical form separate from other portions of the memory controller 202. Portions of the processor 206 may be implemented by combinations of discrete components. For example, the encryption logic 208 may be implemented as an ASIC, while other processor functionalities (e.g., memory access request processing/queuing) may be implemented as an FPGA with various stages in a specified configuration. Although illustrated as a component within the memory controller 202 in FIG. 2, the processor 206 may be external to the memory controller 202 or have a number of components located within the memory controller 202 and a number of components located external to the memory controller 202.

The non-volatile memory devices 210 may store and provide information (e.g., data and instructions) for each of the tenants 221 and 222 responsive to memory access requests received from the memory controller 202, e.g., memory access requests routed or processed by processor 206 from host computing device 204. In operation, the non-volatile memory devices 210 may process memory access requests to store and/or retrieve information based on memory access requests originating from the tenants 221 and 222. For example, the host computing device 204 may include a host processor which may execute a user application of the tenant 221 or the tenant 222 requesting stored data and/or stored instructions at non-volatile memory devices 210 (and/or to store data/instructions). When executed, the user application may generate a memory access request to access data or instructions in the non-volatile memory devices 210. Generally, as described above, a memory access request can be or include a command and an address, for example, a memory command and a memory address. In various implementations, the memory access request may be or include a command and an address for a read operation, a write operation, an activate operation, or a refresh operation at non-volatile memory devices 210. Generally, a received command and address may facilitate the performance of memory access operations at non-volatile memory devices 210, such as read operations, write operations, activate operations, and/or refresh operations for non-volatile memory devices 210. Accordingly, the memory access request may be or include a memory address(s) for one or more of the non-volatile memory devices 210. In an example of a write operation, the memory access request may also include data, e.g., in addition to the command and the address. The memory access requests from the host computing device 204 are provided to the processor 206 via the host bus 220 and host interface 212. For example, the host bus 220 may be a PCIe bus, and the host interface 212 may be a PCIe interface for the processor 206.

Advantageously, the memory system 200, in receiving memory access requests at the memory controller 202, facilitates the generation of encrypted keys, like key 228 for the tenant 221 and key 229 for the tenant 222, to access data stored accessed on the non-volatile memory devices 210. For example, in receiving a memory access request from the tenant 221 at processor 206, the processor 206 may provide an encryption indication to the encryption logic 208 such that an encrypted key 228 is generated for that particular memory access request. A similar arrangement may take place to generate the key 229 for a request from the tenant 222. For example, the encryption logic 208, upon receiving the encryption indication, may identify a memory address in the received memory access request that corresponds to a memory address of at least one of the non-volatile memory devices 210. Once identified, the encryption logic 208 may generate an encrypted key 228 or 229 for data associated with that memory access request. In the example of the write operation, the encrypted key 228 may be generated to secure the data written to the memory address at that non-volatile memory device of the non-volatile memory devices 210 for the tenant 221. The written data may be accessed only if the encrypted key 228 is used to access the data (e.g., to write or to read in another memory access request). Accordingly, in the example, the key 228 may be provided to the non-volatile memory devices 210 with the received memory access request to be used for encryption of the written data.

In such a case, the encrypted key 228 or 229 may be referred to as being associated with the particular data written to the memory address of the received memory access request based on the tenant 221 or 222. Accordingly, the memory controller 202 uses encryption logic 208 to generate encrypted keys 228 and 229 for the non-volatile memory devices 210.

In operation, the encryption logic 208 may generate the key 228 or 229 that is encrypted and used to access data stored on the non-volatile memory devices 210. The encryption logic 208 may receive the pseudorandom value 226 from the PRNG 232 and encrypt the key 228 or 229 based partly on the pseudorandom value 226 and a respective provisioned key. For example, the provisioned key may be a DEK stored in a register of the memory controller 202 or cache 214. The key 228 or 229 may be used by the memory controller 202 to authenticate access to the non-volatile memory devices 210. The encryption logic 208 may store the keys 228 and 229 at the cache 214. For example, the cache 214 may include registers for data storage and the keys 228 and 229 may be stored in a register of the cache 214. In such a case, the cache 214 may be referred to as being associated with the encryption logic 208. For example, the encryption logic 208 may be configured to provide the generated encrypted keys 228 and 229 to the cache 214 for storage or a specific register of the cache 214 for storage. The cache 214 may be a RAM device, like a SRAM or DRAM storage device. In various implementations, the cache 214 may be a dynamic memory device, like a DRAM, and may interact with the processor 206. For example, the cache 214 may be a data cache that includes or corresponds to one or more cache levels of L1, L2, L3, L4 (e.g., as a multi-level cache), or any other cache level. In some implementations, the encryption logic 208 may also store the key 228 in a register (e.g., a data register) of the memory controller 202.

To generate the keys 228 and 229 that are encrypted, the PRNG 232 may generate the pseudorandom value 226. In various implementations, the PRNG 232 may be a linear-feedback shift register (LFSR), such that an output of the PRNG 232 is a random value. For example, the LFSR may comprise a combination of one or more XOR logic units (also referred to as XOR logic gates) that receive feedback as input, such that the output of the combination of one or more XOR logic units is the pseudorandom value 226. Accordingly, as depicted in FIG. 2, a pseudorandom value 226 is provided to the encryption logic 208 to be used as an initialization vector (IV) in the encryption logic 208.

The memory controller 202 may utilize the pseudorandom value 226 as an initialization vector for an authenticated stream cipher to generate the encrypted key 228. Upon the processor 206 receiving the pseudorandom value 226, the processor may route the pseudorandom value 226 to the encryption logic 208, where encryption logic 208 may use the pseudorandom value 226 as an initialization vector (IV) for an authenticated stream cipher. For example, the authentication encryption logic 208 may include an AES-Galois-Counter Mode (AES-GCM) pipeline, such that the authentication encryption logic 208 generate a key 228 and 229 based on the authenticated stream cipher using the pseudorandom value 226 as the IV and/or a provisioned key (e.g., a DEK) from the tenant 221 or 222. For example, the GCM may generate an authentication tag for the encrypted keys 228 and 229 using an underlying key (e.g., a DEK). Accordingly, in the context of a write operation in obtained received memory access request, the keys 228 and 229 may be used to encrypt the data to be written as plaintext to ciphertext for each respective tenant 221 and 222. While AES-GCM is described in some examples, it is to be understood that other authenticated stream ciphers or other types of cyphers (e.g., quantum cyphers) may also be used in encryption logic 208 to generate encrypted keys, like keys 228 and 229.

In the example of a received memory access request including a read command associated with one of the tenants 221 or 222, the memory system 200, advantageously, also facilitates the retrieval of encrypted keys, like key 228 or 229, to read data on the non-volatile memory devices 210. For example, responsive to receiving a memory access request at processor 206, the processor 206 may provide an encryption indication (e.g., encryption signal) to the encryption logic 208. Responsive to the encryption indication, the encryption logic 208 may retrieve an encrypted key 228 or 229 for that particular memory access request based on a memory address in the received memory access request. For example, the encryption logic 208, upon receiving the encryption indication, may identify a memory address in the received memory access request that corresponds to a memory address of at least one of the non-volatile memory devices 210. Once identified, the encryption logic 208 may retrieve an encrypted key 228 for data associated with that memory access request. The keys 228 and 229 may be used to securely retrieve respective data or read the respective data at the memory address of a particular non-volatile memory device of the non-volatile memory devices 210. The data to be read may be accessed only if the encrypted key 228 or 229 is used to access the data. For example, once the read data is retrieved from the non-volatile memory devices 210, the processor 206 may use the encryption logic 208 and the key 228 or 229 to decrypt the read data. As an example, the encryption logic 208 may apply a converse decryption algorithm to the encryption algorithm that was used to encrypt the key 228 or 229. In the implementation of an AES-GCM pipeline, the key 228 or 229 may be used to decrypt retrieved read data that is ciphertext as plaintext. In such a case, the encrypted keys 228 and 229 may be referred to as being associated with the respective data to be read from the respective memory address of the received memory access request, which may be associated with one of the tenants 221 or 222. Accordingly, the memory controller 202 uses encryption logic 208 to retrieve encrypted keys 228 and 229 for the non-volatile memory devices 210.

Because the encryption keys 228 and 229 are stored in the shared cache 214, there may instances where a malicious tenant 221 or 222 could try to attack the volatile nature of the cache 214 to retrieve the key 228 or 229 of the other tenant 221 or 222, such as via a row hammer type of attack. Thus, the encryption logic 208 may include circuitry to detect these malicious attacks, and to circumvent the attacks, such as by blocking memory accesses by the malicious tenant 221 or 222, refresh victim rows, and/or erase the target key 228 or 229 from the cache 214. Erasing the target key 228 or 229 may prevent it from falling into the wrong hands, and therefore prevent unauthorized access to encrypted data stored at the non-volatile memory devices 210.

The non-volatile memory devices 210 may store data retrieved by and/or for access by the computing device 204 on behalf of the tenants 221 and 222. As some examples, the computing device 102 may be a server at a data center or a laptop at a data center, and the computing device 102 may process datasets (e.g., image or content datasets) for use by one or more neural networks hosted on computing device 204. A dataset for each tenant 221 and 222 may be stored in one or more of the non-volatile memory devices 210 (e.g., one or both of the datasets may be distributed among the non-volatile memory devices 210). In some implementations, one or both of the datasets may include personally identifiable information (PII) such that an operator of the server may desire security for the data stored on the non-volatile memory devices 210. For example, if a malicious tenant 221 or 222 were to try to access the key 228 or 229 in an effort to acquire the PII data stored on the non-volatile memory devices 108 for the other tenant 221 or 222, the key 228 or 229 to access the target data stored on the non-volatile memory devices 210 would be erased from the cache 214 of the memory controller 202 when the memory controller 202 detects the attack on the cache 214; thereby making it difficult for the malicious tenant 221 or 222 to access the data stored on the non-volatile memory devices 210. While PII has been provided as an example of data for which security may be desired, any data may be protected in accordance with examples described herein including proprietary data, sensitive data, or confidential data.

Additionally or alternatively, as described with respect to memory controller 104, memory controller 202 may be an NVDIMM memory controller, which is coupled to the host computing device 204 via the host bus 220. The host bus 220 may operate in accordance with an NVDIMM protocol, such as NVDIMM-F, NVDIMM-N, NVDIMM-P, or NVDIMM-X. For example, in such implementations, the non-volatile memory devices 210 may include NAND memory devices or 3D XPoint memory devices or compute express link (CXL) devices that are configured to communicate over a CXL bus. Accordingly, in such implementations, the non-volatile memory devices 210 may operate as persistent storage for the cache 214, which may be a volatile memory device and/or operate as persistent storage for any volatile memory on the memory controller 202 or the host computing device 204. In various implementations, the memory controller 104 may be implemented using the memory controller 202, including any of the methods described here that may be performed in the memory controller 202.

Figure 3:
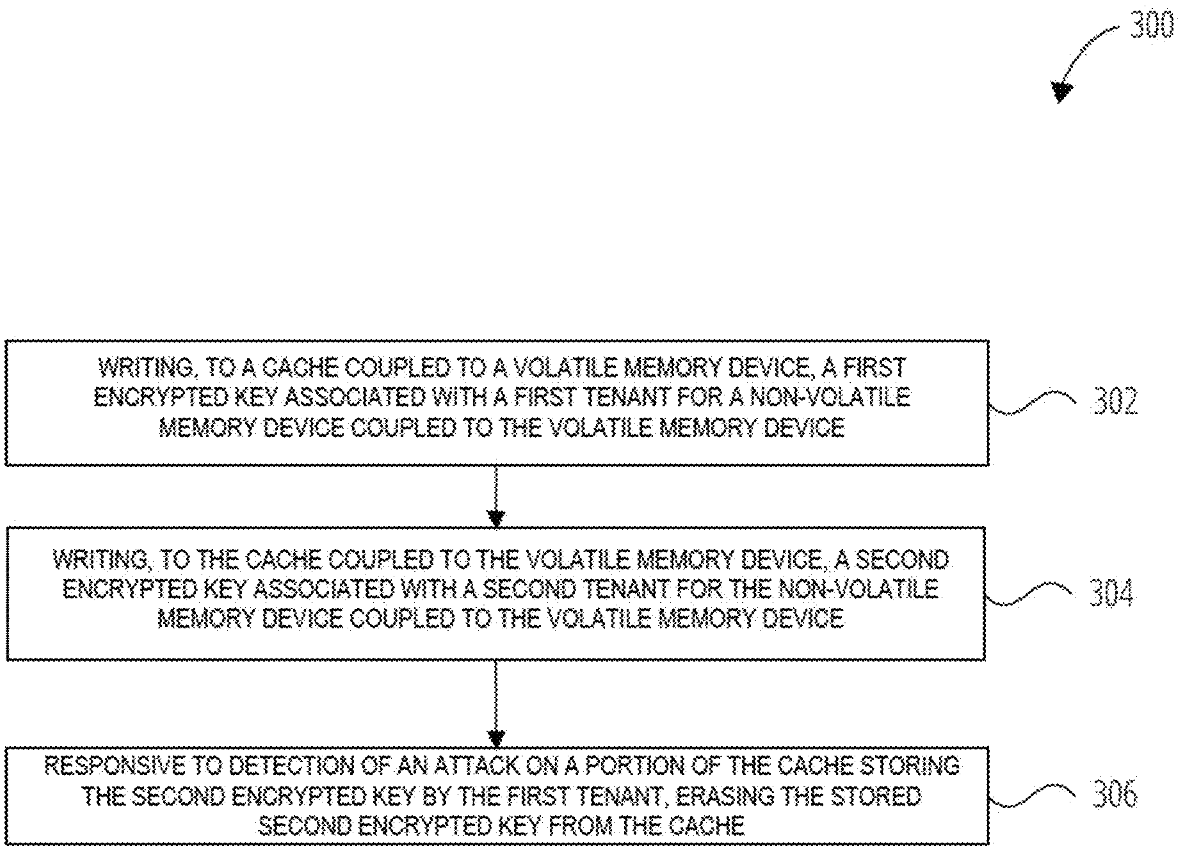
FIG. 3 is a schematic illustration of a method in accordance with examples described herein.

FIG. 3 is a schematic illustration of a method 300 in accordance with examples described herein. Example method 300 may be performed using, for example, the memory controller 104 of FIG. 1 and/or the processor 206 of FIG. 2 that executes executable instructions (e.g., stored in a memory, not necessarily shown) to interact with the non-volatile memory devices 210 via respective memory buses 218. In some examples, the method 300 may be wholly or partially implemented by the encryption logic 106 of FIG. 1 and/or the encryption logic 208 of FIG. 2. For example, the operations described in steps 302-306 may be stored as computer-executable instructions in a computer-readable medium accessible by the memory controller 104 of FIG. 1 and/or the processor 206 of FIG. 2. In an implementation, the computer-readable medium accessible by the processor 206 may include one of the non-volatile memory devices 108 or the cache 110 of FIG. 1 or one of the non-volatile memory devices 210 or the cache 214 of FIG. 2. For example, the executable instructions may be stored on one of the non-volatile memory devices 210 and retrieved by a memory controller 202 for the processor 206 to execute the executable instructions for performing the method 300. Additionally or alternatively, the executable instructions may be stored on a memory coupled to the host computing device 204 and retrieved by the processor 206 to execute the executable instructions for performing the method 300.

The method 300 includes writing, to a cache coupled to a volatile memory device, a first encrypted key associated with a first tenant for a non-volatile memory device coupled to the volatile memory device, at 302. The method 300 further includes writing, to the cache coupled to the volatile memory device, a second encrypted key associated with a second tenant for the non-volatile memory device coupled to the volatile memory device, at 304. For example, the key 116 (e.g., the first key) associated with the tenant 120 (e.g., the first tenant) for the non-volatile memory devices 108 and the key 118 (e.g., the second key) associated with the tenant 122 (e.g., the second tenant) for the non-volatile memory devices 108 may be written to the cache 110 of FIG. 1, which may be included on a volatile memory device. In another example, the key 228 (e.g., the first key) associated with the tenant 221 (e.g., the first tenant) for the non-volatile memory devices 210 and the key 229 (e.g., the second key) associated with the tenant 222 (e.g., the second tenant) for the non-volatile memory devices 210 may be written to the cache 214 of FIG. 2, which may be included on a volatile memory device. In some examples, the method 300 further includes generating the first encrypted key based partly on a first pseudorandom value from a pseudorandom number generator. In some examples, the method 300 further includes generating the second encrypted key based partly on a second pseudorandom value from the pseudorandom number generator. In some examples, the method 300 further includes generating the first encrypted key using an authenticated stream cipher. In some examples, the first tenant and the second tenant are both hosted on a host computing device. In some examples, the non-volatile memory device comprises at least one of a NAND memory device or a 3D XPoint memory device.

The method 300 further includes, responsive to detection of an attack on a portion of the cache storing the second encrypted key by the first tenant, erasing the stored second encrypted key from the cache, at 306. In some examples, the method 300 includes detecting the attack on the cache via repeated accesses of one portion of the cache physically adjacent the portion or the cache storing the second encrypted key. In some examples, the method 300 further includes further responsive to detection of an attack on a portion of the cache storing the second encrypted key by the first tenant, blocking all access to the non-volatile memory by the second tenant.

In some examples, the method 300 includes, responsive to receipt of a memory access request from the second tenant, using the second encrypted key to store data to or retrieve data from the non-volatile memory device. In some examples, the method 300 includes, responsive to receipt of a memory access request from the first tenant, using the first encrypted key to store data to or retrieve data from the non-volatile memory device.

The steps included in the described example method 300 are for illustration purposes. In some embodiments, these steps may be performed in a different order. In some other embodiments, various steps may be eliminated. In still other embodiments, various steps may be divided into additional steps, supplemented with other steps, or combined together into fewer steps. Other variations of these specific steps are contemplated, including changes in the order of the steps, changes in the content of the steps being split or combined into other steps, etc.

Certain details are set forth above to provide a sufficient understanding of described examples. However, it will be clear to one skilled in the art that examples may be practiced without various of these particular details. The description herein, in connection with the appended drawings, describes example configurations and does not represent all the examples that may be implemented or that are within the scope of the claims. The terms "exemplary" and "example"

as may be used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above are also included within the scope of computer-readable media.

Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific examples have been described herein for purposes of illustration, various modifications may be made while remaining with the scope of the claimed technology. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method comprising:

writing, to a cache coupled to a volatile memory device, a first encrypted key associated with a first tenant for a non-volatile memory device coupled to the volatile memory device;

writing, to the cache coupled to the volatile memory device, a second encrypted key associated with a second tenant for the non-volatile memory device coupled to the volatile memory device; and responsive to detection of an attack on a portion of the cache storing the second encrypted key by the first tenant, erasing the stored second encrypted key from the cache.

2. The method of claim 1, further comprising detecting the attack on the cache via repeated accesses of one portion of the cache physically adjacent the portion or the cache storing the second encrypted key.

3. The method of claim 1, further comprising, further responsive to detection of an attack on a portion of the cache storing the second encrypted key by the first tenant, blocking all access to the non-volatile memory by the second tenant.

4. The method of claim 1, further comprising, responsive to receipt of a memory access request from the second tenant, using the second encrypted key to store data to or retrieve data from the non-volatile memory device.

5. The method of claim 4, further comprising, responsive to receipt of a memory access request from the first tenant, using the first encrypted key to store data to or retrieve data from the non-volatile memory device.

6. The method of claim 1, wherein the first tenant and the second tenant are both hosted on a host computing device.

7. The method of claim 1, wherein the non-volatile memory device comprises at least one of a NAND memory device or a 3D XPoint memory device.

8. The method of claim 1, further comprising generating the first encrypted key based partly on a pseudorandom value from a pseudorandom number generator.

9. The method of claim 8, further comprising generating the first encrypted key using an authenticated stream cipher.

10. An apparatus comprising:

a cache of a volatile memory configured to store a first encrypted key associated with a first tenant used to access a non-volatile memory and a second encrypted key associated with a second tenant used to access the non-volatile memory; and a processor having encryption logic configured to detect an attack on a portion of the cache storing the second encrypted key by the first tenant, and to erase the stored second encrypted key from the cache in response to detection of the attack.

11. The apparatus of claim 10, wherein the encryption logic is configured to detect the attack on the cache based on repeated accesses of one portion of the cache physically adjacent the portion or the cache storing the second encrypted key.

12. The apparatus of claim 10, wherein the encryption logic is further configured to, responsive to detection of an attack on a portion of the cache storing the second encrypted key by the first tenant, block all access to the non-volatile memory by the second tenant.

13. The apparatus of claim 10, wherein the processor is configured to:

responsive to receipt of a memory access request from the second tenant, using the second encrypted key to store data to or retrieve data from the non-volatile memory device; and responsive to receipt of a memory access request from the first tenant, using the first encrypted key to store data to or retrieve data from the non-volatile memory device.

14. The apparatus of claim 10, wherein the first tenant and the second tenant are both hosted on a host computing device.

15. The apparatus of claim 10, wherein the encryption logic is further configured to generate the first encrypted key based partly on a pseudorandom value from a pseudorandom number generator.

16. The apparatus of claim 15, wherein the encryption logic is further configured to generate the first encrypted key using an authenticated stream cipher.

17. A system comprising:

a host computing device configured to host a first tenant and a second tenant;

non-volatile memory configured to store data for the first tenant and data for the second tenant; and a memory controller comprising:

a cache of a volatile memory configured to store a first encrypted key associated with the first tenant used to access the data stored at the non-volatile memory and a second encrypted key associated with the second tenant used to access the data stored at the non-volatile memory; and a processor having encryption logic configured to detect an attack on a portion of the cache storing the second encrypted key by the first tenant, and to erase the stored second encrypted key from the cache in response to detection of the attack.

18. The system of claim 17, wherein the encryption logic is configured to detect the attack on the cache based on repeated accesses of one portion of the cache physically adjacent the portion or the cache storing the second encrypted key.

19. The system of claim 17, wherein the encryption logic is further configured to, responsive to detection of an attack on a portion of the cache storing the second encrypted key by the first tenant, block all access to the non-volatile memory by the second tenant.

20. The system of claim 17, wherein the processor is configured to:

responsive to receipt of a memory access request from the second tenant, using the second encrypted key to store data to or retrieve data from the non-volatile memory device; and responsive to receipt of a memory access request from the first tenant, using the first encrypted key to store data to or retrieve data from the non-volatile memory device.

21. The system of claim 17, wherein the encryption logic is further configured to generate the first encrypted key based partly on a pseudorandom value from a pseudorandom number generator.

22. The system of claim 21, wherein the memory controller further comprises the pseudorandom number generator configured to generate the pseudorandom value.

* * * * *